United States Patent [19]

Fukuchi et al.

[11] Patent Number: 5,991,684
[45] Date of Patent: Nov. 23, 1999

[54] APPARATUS AND METHOD OF DETECTING COMBUSTION STATE OF INTERNAL COMBUSTION ENGINE AND RECORDING MEDIUM STORING PROGRAM FOR EXECUTION OF THE DETECTING METHOD

[75] Inventors: Eisaku Fukuchi, Hitachi; Akihito Numata, Ibaraki-ken, both of Japan

[73] Assignees: Hitachi, Ltd.; Hitachi Car Engineering Co., Ltd., both of Japan

[21] Appl. No.: 08/966,358

[22] Filed: Nov. 7, 1997

Related U.S. Application Data

[63] Continuation-in-part of application No. 08/704,368, Aug. 28, 1996, abandoned.

[30] Foreign Application Priority Data

Sep. 4, 1995 [JP] Japan .................................. 7-226831
Nov. 7, 1996 [JP] Japan .................................. 8-294873

[51] Int. Cl.$^6$ .................................................. G01M 15/00
[52] U.S. Cl. ............................ 701/110; 73/116; 73/117.3; 123/436
[58] Field of Search ...................................... 701/101, 110, 701/111; 73/116, 117.2, 117.3, 118.1; 123/419, 436

[56] References Cited

U.S. PATENT DOCUMENTS

| | | | |
|---|---|---|---|
| 5,095,742 | 3/1992 | James et al. ................................ | 73/116 |
| 5,263,453 | 11/1993 | Wakahara et al. ....................... | 123/436 |
| 5,301,546 | 4/1994 | Inada et al. ............................... | 73/117.3 |
| 5,307,671 | 5/1994 | Akase ........................................ | 73/117.3 |
| 5,361,629 | 11/1994 | McCombie .............................. | 73/117.3 |
| 5,377,537 | 1/1995 | James ........................................ | 73/117.3 |
| 5,421,196 | 6/1995 | Angermaier et al. .................... | 73/117.3 |
| 5,440,922 | 8/1995 | Ichikawa .................................. | 73/117.3 |
| 5,452,604 | 9/1995 | Namiki et al. ............................ | 73/116 |
| 5,497,328 | 3/1996 | Sugai et al. ............................... | 701/101 |
| 5,503,008 | 4/1996 | Machida .................................... | 73/117.3 |
| 5,528,929 | 6/1996 | Ikebuchi ................................... | 73/116 |
| 5,531,108 | 7/1996 | Feldkamp et al. ....................... | 73/117.3 |
| 5,587,524 | 12/1996 | Hampo et al. ............................ | 73/116 |
| 5,596,140 | 1/1997 | Boyce et al. ............................. | 73/117.3 |
| 5,687,692 | 11/1997 | Togai et al. ............................... | 123/436 |

FOREIGN PATENT DOCUMENTS 58-51243 of 0000 Japan .
9-72241 of 0000 Japan .

OTHER PUBLICATIONS

European Search Report.

*Primary Examiner*—George Dombroske
*Attorney, Agent, or Firm*—Evenson McKeown Edwards & Lenahan PLLC

[57] ABSTRACT

In an apparatus of detecting a combustion state of an internal combustion engine, a combustion parameter value of the engine is calculated on the basis of measurement data concerning an engine speed, the value of the data concerning the engine speed is corrected with a correction value, the correction value is calculated to make the calculated combustion parameter fall within a predetermined range, and the correction value is set to a predetermined value when a predetermined condition is satisfied.

19 Claims, 11 Drawing Sheets

WITH PITCH ERROR CORRECTION

WITHOUT PITCH ERROR CORRECTION

FIG. 8

S/N DETERIORATION REGION

| ENGINE SPEED \ LOAD | $20 (NO LOAD) | $40 | $60 | $80 | $A0 |
|---|---|---|---|---|---|
| 1000 | 0.922 | 2.25 | 2.06 | 2.07 | 1.99 |
| 2000 | 0.935 | 1.34 | 1.40 | 1.13 | 1.00 |
| 3000 | 1.21 | 1.15 | 1.16 | 1.10 | 1.14 |
| 4000 | 3.08 | 2.40 | 1.89 | 1.75 | 1.74 |
| 5000 | 5.10 | 3.79 | 2.50 | 2.02 | 2.08 |
| 6000 | 4.92 | 2.11 | 2.22 | 2.57 | 2.17 |

$$\text{S/N IMPROVING RATIO} = \frac{\text{S/N WITH P/E CORRECTION}}{\text{S/N WITHOUT P/E CORRECTION}}$$

APPARATUS AND METHOD OF DETECTING COMBUSTION STATE OF INTERNAL COMBUSTION ENGINE AND RECORDING MEDIUM STORING PROGRAM FOR EXECUTION OF THE DETECTING METHOD

CROSS-REFERENCE TO RELATED APPLICATION

The present application is a Continuation-In-Part of U.S. patent application Ser. No. 08/704,368 filed on Aug. 28, 1996 now abandoned. The disclosure of that application is incorporated therein by reference.

BACKGROUND OF THE INVENTION

The present invention relates to detection of a combustion state of an internal combustion engine (hereinafter simply referred to as an engine) and more particularly, to engine combustion state detecting apparatus and method capable of detecting a misfire in all running regions of the engine in which positive torque is generated, and to a recording medium which stores a program for execution of the detecting method.

A technique for measuring an engine speed by utilizing the relation between torque generated through combustion cycles of the engine and engine speed and detecting a running state of the engine to indirectly detect a misfire is described in, for example, Japanese Patent Application laid-open No. JP-A-58-51243. In this technique, engine speeds are detected at two ignition time points during one ignition cycle covering the preceding ignition and the present ignition, a change value of engine speed during the one ignition cycle is determined from a difference in engine speeds between the two ignition time points, change values of engine speed sequentially determined are operationally processed in statistical manner, and the presence or absence of a misfire in the engine is decided using results of the operational process.

The aforementioned method is effective to detect a misfire at relatively low engine speeds but production errors in pitch of a disk plate or a ring gear mounted for measurement of the engine speed greatly affect the detection at high engine speeds, making it difficult to detect a misfire. A countermeasure there-against is a method disclosed in JP-A-9-72241 by the present inventors, according to which an engine speed signal (time signal) is corrected by detecting a pitch error component during normal combustion.

The pitch error correcting method disclosed in the above gazette is effective when the engine is running at a high engine speed but at low engine speeds or under no load (idling), the accuracy of misfire detection tends to be degraded.

Incidentally, when a vehicle runs on a bad road or a rough road, the engine backwardly receives torque (negative torque) from driven wheels. Since the backward torque has an inconstant value, the engine undergoes a change in engine speed which is not attributable to the combustion state. When the vehicle carrying a misfire detecting apparatus based on the above pitch error correcting method runs on a bad road, negative torque affects the misfire detection.

SUMMARY OF THE INVENTION

The misfire detection can be utilized for diagnosis of faults of an ignition system, a fuel injection system or an exhaust emission control system. Further, by using the misfire detecting technique, the air/fuel ratio of a mixture and ignition timings can be controlled to optimal values in consideration of the rate of fuel combustion, the output power or the exhaust emission.

An object of the present invention is to provide engine combustion state detecting apparatus and method which can accurately detect a combustion state or a misfire in all running regions covering a low engine speed region under no load and a high engine speed region under high loads, and a recording medium which stores a program for execution of the detecting method.

In an apparatus of detecting a combustion state of an engine according to the present invention, a combustion parameter value of the engine is calculated on the basis of measurement of data concerning an engine speed, a value of the data concerning the engine speed is corrected with a correction value, the correction value is calculated such that the calculated combustion parameter value falls within a predetermined range, and the correction value is set to a predetermined value when a predetermined condition is satisfied.

BRIEF DESCRIPTION OF THE DRAWINGS

FIG. 8 is a table showing improving ratios of misfire detection S/N ratio achieved by the pitch error correction.

DESCRIPTION OF THE PREFERRED EMBODIMENTS

An engine control apparatus according to the present invention will now be described by way of example with reference to the accompanying drawings.

Figure 1:
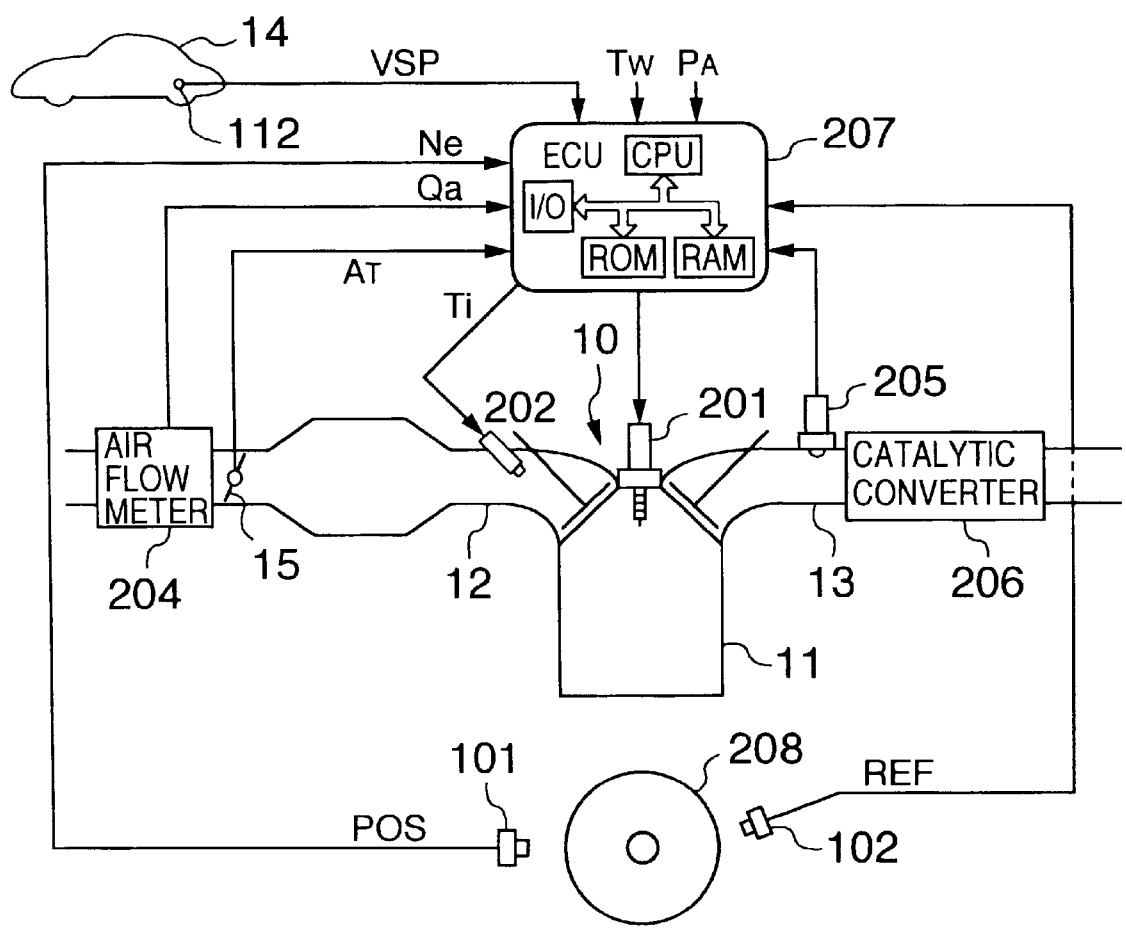
FIG. 1 is a diagram showing an overall construction of an engine combustion state detecting apparatus according to an embodiment of the present invention.

Referring to FIG. 1, there is illustrated an overall construction of a control system of an engine 10 according to the present invention.

The engine 10 has four cylinders and an intake tube 12 and an exhaust tube 13 are connected to each cylinder 11. The cylinder 11 is also mounted with an ignition device 201. A fuel injection unit 202 is arranged in the intake tube 12. An air cleaner (not shown) and an intake air flow meter (hereinafter simply referred to as air flow meter) 204 are mounted upstream of the intake tube 12. The exhaust tube 13 is mounted with an exhaust gas component sensor 205 for measurement of air/fuel ratio and a three-way catalytic converter 206.

An electronic control unit 207 computes a fuel injection quantity Ti on the basis of an engine speed Ne and an intake air flow rate Qa, and controls the fuel injection unit 202 by a drive signal conforming to the fuel injection quantity. A signal representative of the intake air flow rate Oa is delivered out of the air flow meter 204. The control unit 207 can be realized with a computer. The control unit 207 includes a CPU, a ROM for storing a control program, a RAM for storing calculated data and an interface I/O for input/output control of signals. A signal representative of the engine speed Ne is delivered out of an engine speed detector 101. The engine speed detector 101 is, for example, a magnetic pickup which is disposed near a rotatable ring gear or metal disk plate 208 formed with teeth at equal intervals. The ring gear or metal plate 208 is mounted to a rotary shaft of the engine. Each time that a tooth of the plate 208 passes by the vicinity of the engine speed detector 101, a pulse is generated to provide the engine speed signal Ne. Further, there is provided a sensor 102 for detection of a reference rotary position, for example, a top dead center (TDC) of a specified cylinder. The speed detection belongs to a known technical field and will be described briefly.

The control unit 207 fetches data $A_T$ concerning a throttle opening from a throttle sensor (not shown) provided in a throttle valve 15, vehicle speed data VSP from a vehicle speed sensor 112 of a vehicle 14 carrying the engine 10 and data pieces from not-shown various sensors, for example, cooling water temperature $T_W$ and atmospheric pressure $P_A$ and can use these data pieces to carry out the combustion state detecting process. Of course, data other than the above can be fetched from the engine and sensors arranged in the vehicle and can be utilized, as will be obvious to those skilled in the art.

The engine control unit 207 also performs so-called air/fuel ratio feedback control of the engine 10 in which the air/fuel ratio (hereinafter abbreviated as A/F) of a mixture is controlled to a stoichiometric value by correcting the fuel injection quantity Ti on the basis of a result of detection by the exhaust gas component sensor 205.

Figure 2:
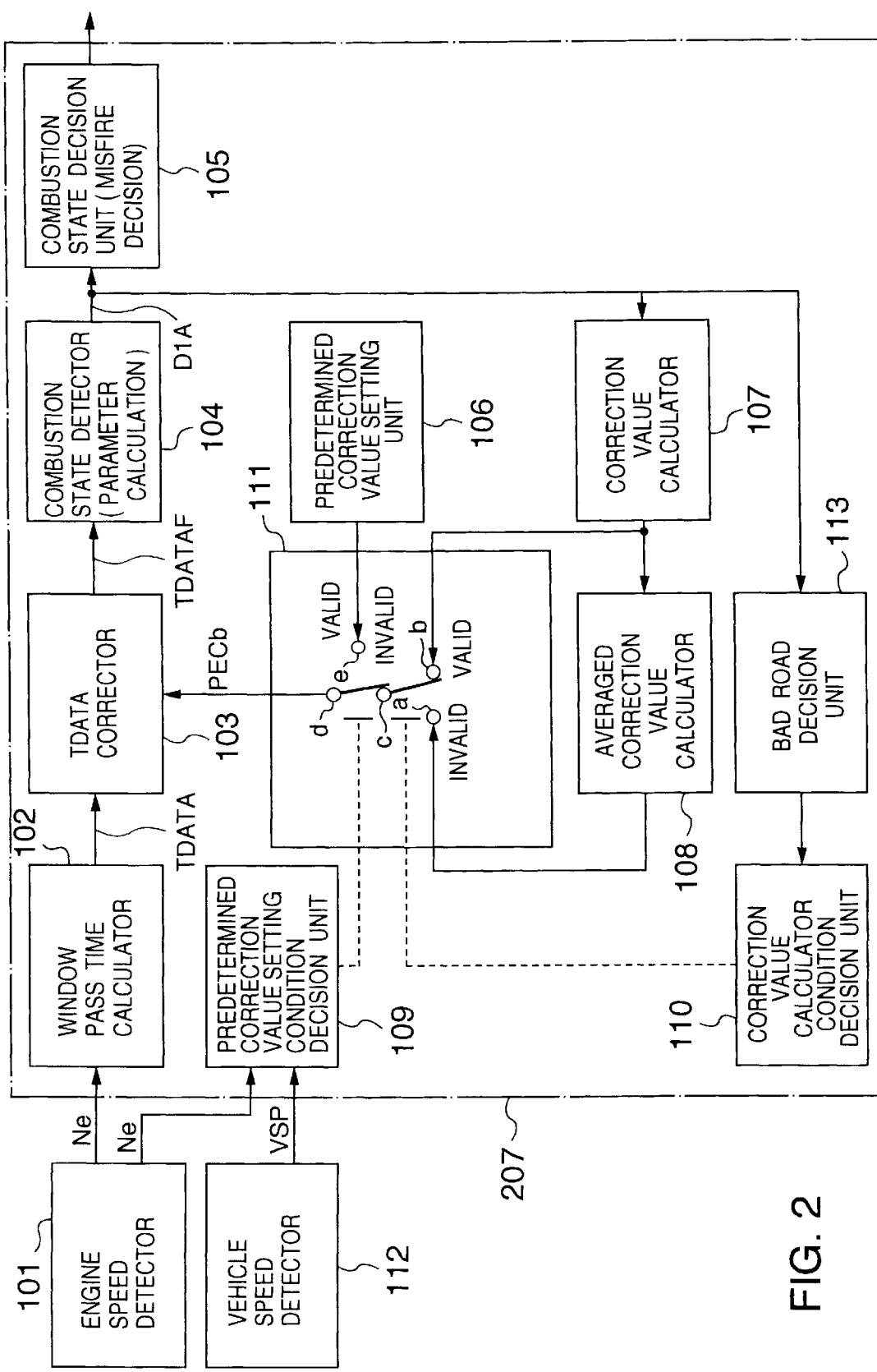
FIG. 2 is a block diagram showing control by the FIG. 1 combustion state detecting apparatus.

FIG. 2 shows, in block form, control of the engine combustion state detection according to the present embodiment. The engine speed detector 101 detects an engine speed Ne of the engine 10. The window pass time calculator 102 detects a time required for the crank shaft to rotate through a predetermined angle (window pass time TDATA) on the basis of the engine speed signal Ne. A TDATA corrector 103 corrects the window pass time TDATA with a correction value PECb. In the correction process by the TDATA corrector 103, an error in pitch of the engine speed detecting plate 208, for example, is carried out. A combustion state detector 104 receives a corrected window pass time TDATA (TDATAF) and calculates a combustion state parameter D1A on the basis of equation (1) to be described later. A combustion state decision unit 105 decides a combustion state, that is, the presence or absence of a misfire on the basis of the combustion state parameter D1A.

A correction value calculator 107 calculates a correction value PECb for correcting the window pass time TDATA from the combustion state parameter of the combustion state detecting apparatus. An averaged correction value calculator 108 calculates an average value PECFb of correction values PECb obtained over a time period starting with a past time point and ending in a current time point. Normally, the window pass time TDATA is corrected by means of the TDATA corrector 103 on the basis of a correction value PECb calculated by the correction value calculator 107 and sent to the combustion state detector 104.

The correction value PECb can be formatted into a correction coefficient or a correction time (correction quantity). The TDATA corrector 103 can correct an inputted window pass time TDATA by multiplying it by a correcting coefficient or dividing it by the correcting coefficient; or by adding a correcting time to it or subtracting the correcting time from it. In the present invention, the correction can be made using other correction arithmetic than the four fundamental rules of arithmetic. The corrected data can also be stored in the form of a data table in a memory in advance and a corrected window pass time TDATAF can be read out of the data table.

A bad road running decision unit 113 decides whether or not the vehicle is running on a bad road on the basis of the output signal D1A of the combustion state detector 104. A deciding method will be described later. When bad road running is determined, a correction quantity calculating condition decision unit 110 determines that a correction value calculating condition is not satisfied. With the condition unsettled, a correction value decider 111 interconnects contacts a, c and d so that the window pass time TDATA may be corrected with the average value PECFb of correction values calculated by the averaged correction value calculator 108 by means of the TDATA corrector 103.

A predetermined correction value setting condition decision unit 109 decides, on the basis of the engine speed Ne and vehicle speed VSP detected by the engine speed detector 101 and vehicle speed detector 112, whether or not a setting condition for making the correction value PECb a predetermined value is satisfied. If the condition is satisfied, the contact d is connected to a contact e in the correction value decision unit 111 and the decision unit 106 is supplied in the form of the correction value PECb to the TDATA corrector 103.

Figure 3:
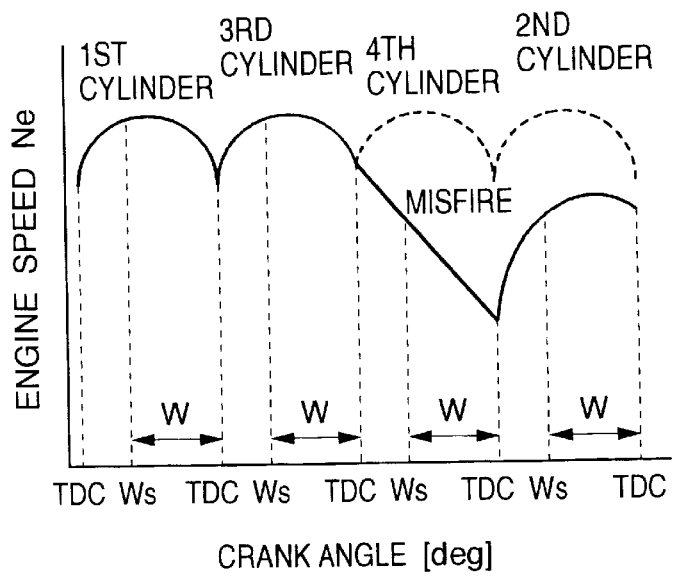
FIG. 3 is a graph showing a change in engine speed when a misfire occurs in one cylinder of the engine.

FIG. 3 shows the engine speed Ne in relation to the crank angle of the engine. Solid line represents a waveform when a misfire occurs in the fourth cylinder and dotted line represents a waveform when combustion states of all cylinders are normal.

Figure 12:
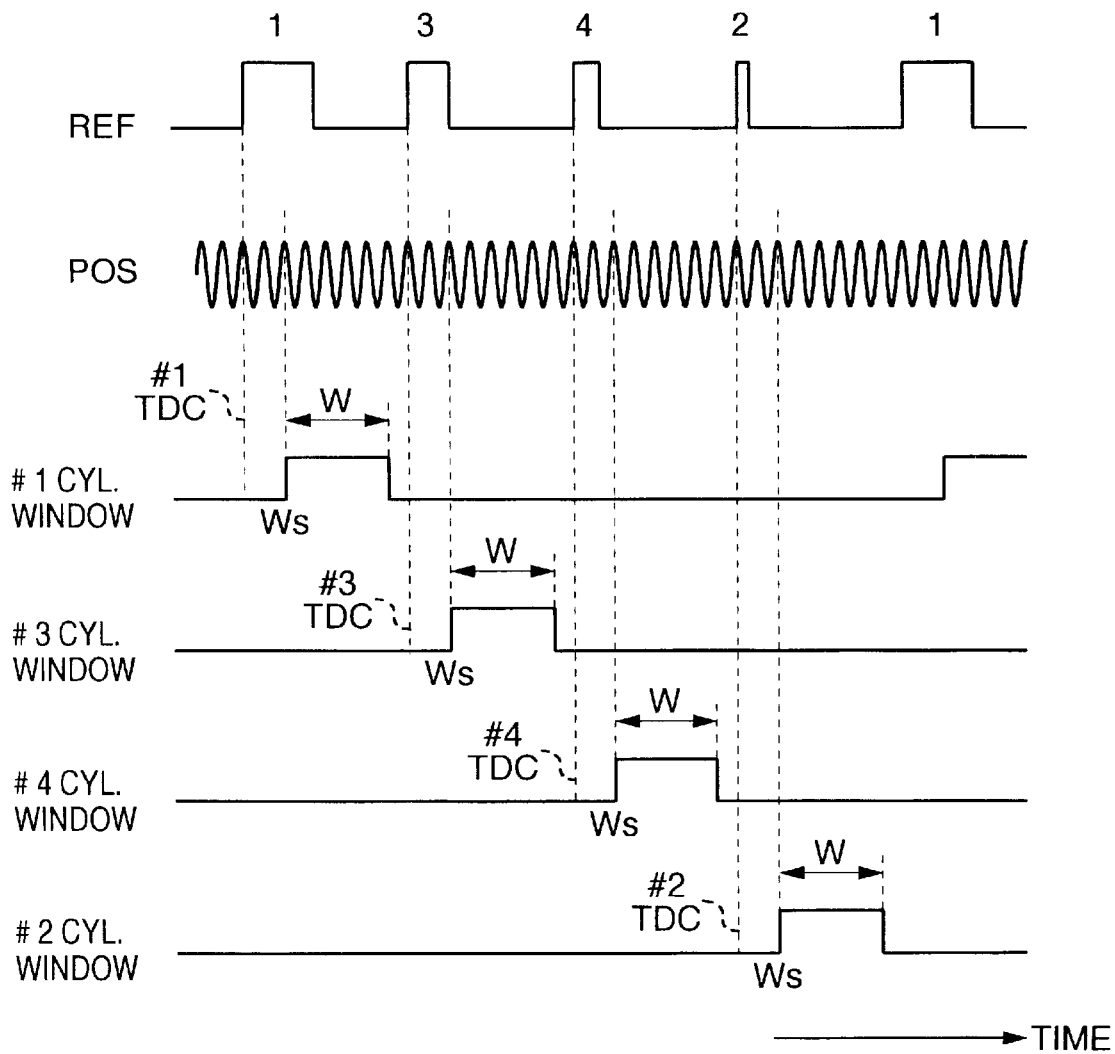
FIG. 12 is a waveform diagram for explaining a method of measuring window pass time data TDATA.

An engine speed measuring section in each cylinder (hereinafter called a window) in FIG. 3 will be described with reference to FIG. 12.

A top dead center (TDC) of each cylinder is detected in accordance with a reference signal REF obtained from the position sensor 102. As shown in FIG. 12, a rise (or a fall) of the REF signal represents a top dead center. The respective cylinders are discriminated from each other by making the pulse width of the REF signal different in accordance with the cylinder number. A POS signal is an output signal from the rotary sensor 101. The angle signal pulse POS is counted from a position of the TDC represented by the REF signal to detect a first crank angle, which is determined to be a window start point $W_S$ (FIG. 3). Starting from the window start point $W_S$, the angle signal POS is similarly counted to determine a second crank angle and a width between the first and second crank angles is determined to be a window width W. POS pulses within the window W section are counted to determine a window pass time TDATA.

It is now assumed that a window pass time in a cylinder at an ignition cycle is TDATA (n), the combustion state parameter D1A is determined from equation (1).

$$D1A=(TDATA_{(n)}-TDATA_{(n-1)})/(TDATA_{(n-1)})^3 \quad (1)$$

where $TDATA_{(n)}$: window W pass time in the cylinder at the present ignition cycle $TDATA_{(n-1)}$: window W pass time in a cylinder at the preceding ignition cycle According to equation (1), when the combustion state of the engine 10 is normal, that is, no misfire occurs, the window pass times TDATA of all of the cylinders 11 are equal to each other and consequently, the combustion state parameter D1A is indicated to be zero. In the event that a misfire occurs in the engine 10, torque is not generated and the engine speed is decreased in a misfiring cylinder, with the result that the value of TDATA increases (time is prolonged) and the combustion state parameter D1A has a positive value. Thus, by comparing the combustion state parameter D1A with a preset threshold value D1ATH, the presence or absence of the misfiring cylinder can be detected (see FIG. 4).

Figure 4:
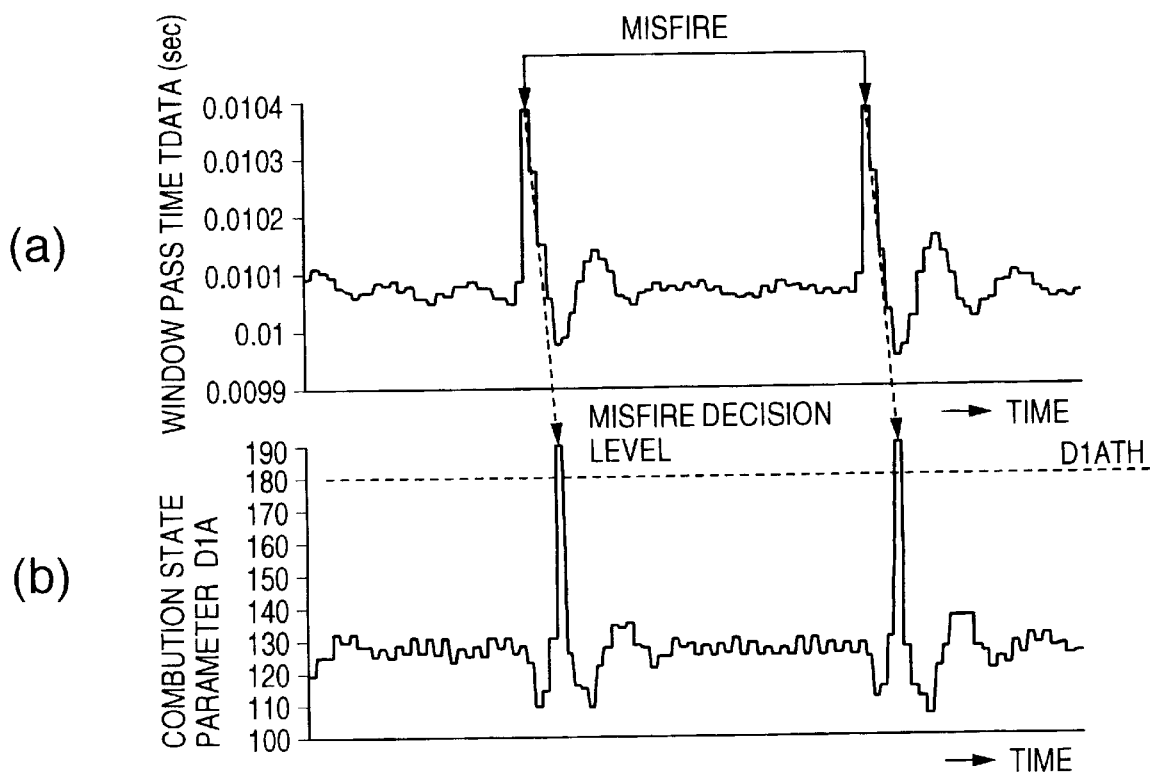
FIG. 4 illustrates at sections (a) and (b) window pass time TDATA and combustion state parameter D1A when a misfire occurs in the engine.

FIG. 4 shows at (a) values of window pass time TDATA of all the cylinders which are plotted in relation to the lapse of time. In a graph at (b) in FIG. 4, combustion parameters D1A determined by calculating the values of window pass time TDATA at (a) pursuant to equation (1) are plotted. In the absence of a misfire, window pass times of all the cylinders are equal to each other and no substantial change occurs (flat region). When a misfire occurs in a cylinder at time points indicated by arrow at (a) in FIG. 4, torque decreases and the window pass time of the misfiring cylinder is prolonged extremely, resulting in a peak. Since the window pass time changes with the engine speed, it is difficult to set the threshold value for misfire decision. But the value of combustion parameter D1A determined pursuant to equation (1) can permit the misfire decision regardless of the value of engine speed. As is clear from (b) in FIG. 4, only the cylinder undergoing the occurrence of the misfire has a value of combustion parameter D1A which is an extremely high peak. The larger the ratio between the peak value of combustion parameter D1A during a misfire and the average value in the absence of a misfire (S/N ratio of misfire detection), the more the accuracy of misfire detection is improved.

The threshold value D1ATH for misfire decision is experimentally determined, in advance, to be a suitable value corresponding to values of parameters by using the engine load and the engine speed as the parameters, and the suitable value can be stored in the form of a data map in the memory. For calculation of the combustion parameter D1A, other equations than equation (1) can obviously be adopted by those skilled in the art.

The above misfire decision method is effective for a relatively low engine speed region but at high engine speeds, irregularity due to a production error in pitch of the plate 208 or ring gear takes place remarkably between the cylinders, making the misfire decision difficult to achieve. As a countermeasure thereagainst, pitch error correction for absorbing the influence of errors in pitch of the plate or ring gear is carried out. In the pitch error correction, when a pitch error correction coefficient calculating condition stands, a pitch error correction coefficient PECb (correction value) is calculated.

Namely, only when the running condition of the engine (and vehicle) satisfies a predetermined condition, a pitch error correction is applied to the value of the window pass time TDATA and the combustion parameter D1A is calculated using a corrected window pass time TDATAF.

But, for example, when a vehicle runs on a bad road, irregularity in the calculated pitch error correction coefficient PECb becomes large and the calculation condition for the pitch error correcting coefficient cannot is satisfied and the pitch error correction coefficient cannot be set to a proper value. Further, at low engine speeds, especially, under no load, the misfire detection S/N ratio is degraded to decrease the detection accuracy. In the present embodiment, two countermeasures against the decrease of the misfire detection S/N ratio are provided.

Here, the definition of the misfire detection S/N ratio will be described. The S/N ratio is a criterion for examining how much the combustion state parameter value during a misfire is higher than that in the absence of a misfire and can be defined by the following equation (2).

S/N ratio=(combustion state parameter average value in the presence of a misfire−combustion state parameter average value in the absence of a misfire)/(combustion state parameter standard deviation in the presence of a misfire+combustion state parameter standard deviation in the absence of a misfire)  (2)

At an S/N ratio of 1, the misfire detection accuracy is 70%, at 2, 95% and at 3 or more, 100%. By examining the S/N ratio, the accuracy of the misfire diagnosis can be evaluated quantitatively.

Next, the pitch error correcting process will be described. In a multi-cylinder engine, a cylinder having a crank phase which is in phase with a particular cylinder is termed an opposing cylinder and a cylinder having a crank phase which is different from the phase of the particular cylinder is termed a non-opposing cylinder. In the case of a typical four-cylinder engine in the present embodiment, the first and fourth cylinders are mutually opposing cylinders and the second and third cylinders are mutually opposing cylinders whereas the second or third cylinder is 180° out of phase with the first (fourth) cylinder and these cylinders are mutually non-opposing cylinders. For the opposing cylinders, the engine speed detection position of the plate 208 is equal. For the non-opposing cylinders, the speed detection position of the plate 208 is different. The pitch error is caused by the fact that the arranging interval of speed detection teeth of the plate 208 varies with the speed detection position. Accordingly, an error in measured value of the window pass time TDATA occurs between the non-opposing cylinders. At high engine speeds, the production error in pitch of the plate or ring gear largely affects the window pass time TDATA and therefore the level of the window pass time TDATA differs for the non-opposing cylinders. In other words, the window pass time TDATA oscillates between the non-opposing cylinders. Since equation (1) is a difference expression, the combustion state parameter determined pursuant to equation (1) by using the oscillating window pass time TDATA also oscillates. A signal obtained during a misfire merges into the oscillating component and the decision level cannot be set, thus making the misfire diagnosis impossible.

To deal with this problem, reference cylinders (here, the second and third cylinders) are set and in non-reference cylinders (here, the first and fourth cylinders), the window pass time TDATA is so corrected as to match with that in the reference cylinders. This is called pitch error correction in which the window pass time in the non-reference cylinders is multiplied by a predetermined value PECb so as to match with that in the reference cylinders.

Figure 5:
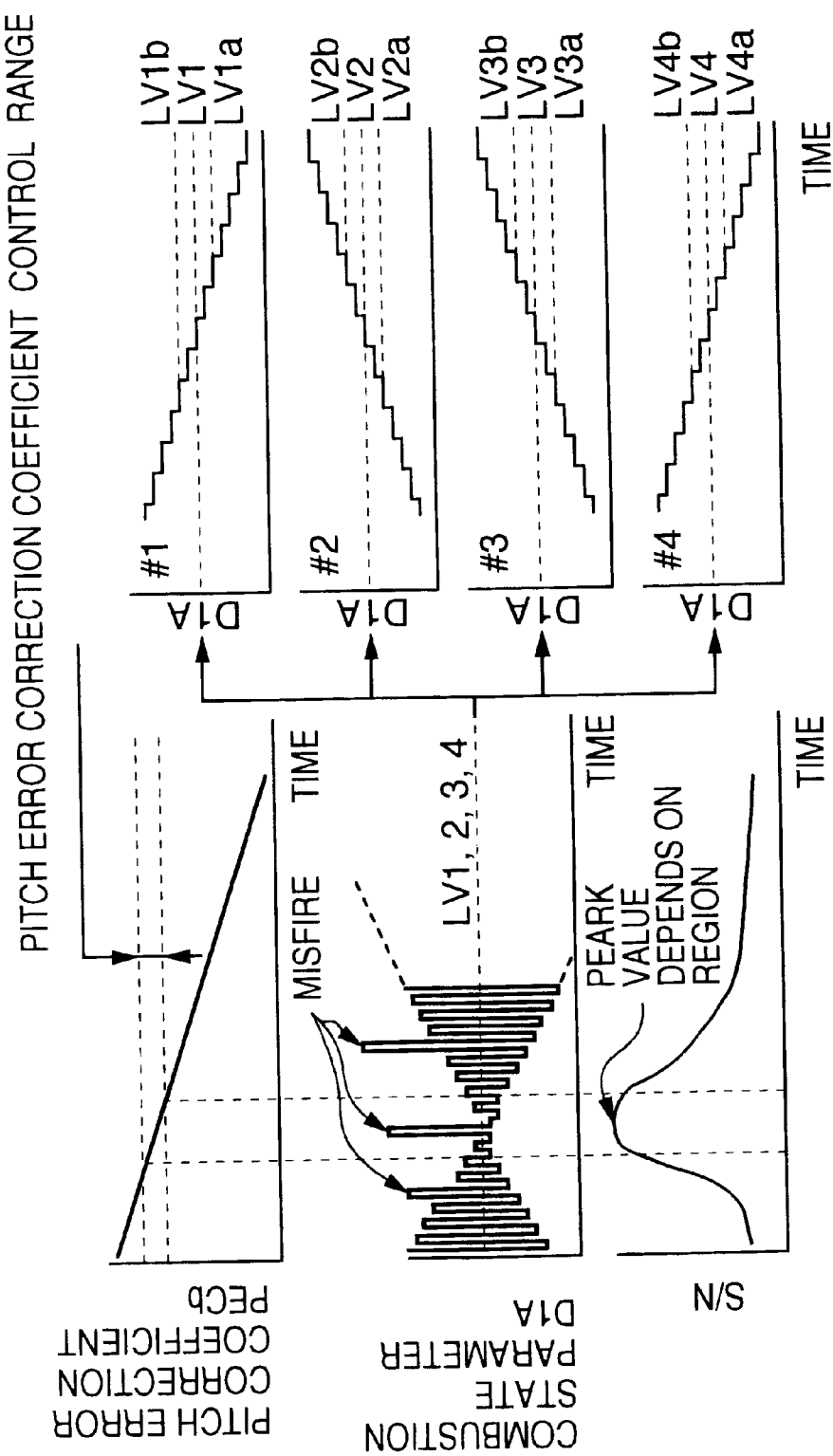
FIG. 5 is a diagram showing the combustion state parameter D1A when the pitch error correction coefficient is decreased.

The above predetermined value is called pitch error correction coefficient PECb and it is important that the pitch error correction coefficient be calculated as a proper value. Referring to FIG. 5, the principle of calculation of the pitch error correction coefficient will be described. As the pitch error correction coefficient is decreased gradually, irregularity in the combustion state parameter is lessened to improve the S/N ratio. But, with the pitch error correction coefficient decreased excessively, the irregularity in the combustion state parameter again increases and the S/N ratio is degraded.

Accordingly, the pitch error correction coefficient is required to be controlled to a point where the S/N is maximized. Here, the combustion state parameter of each cylinder is examined to indicate that the combustion state parameters in the first and fourth cylinders decrease and the combustion state parameters in the second and third cylinders increase. By taking advantage of this operation, predetermined levels LV1 to LV4 are set in the individual combustion state parameters and when the combustion state parameters in the first and fourth cylinders are above LV1 and LV4 and the combustion state parameters in the second and third cylinders are below LV2 and LV3, the pitch error correction coefficient is decreased but in the other case, it is increased. Further, the levels LV1 to LV2 are spread into bands and when the combustion state parameters in all of the cylinders are within the range of the bands, the pitch error correction coefficient is not updated.

Further, when a calculation condition is set for the pitch error correction coefficient and the condition stands, calculation of the pitch error correction coefficient is executed. When a misfire occurs, the pitch error component cannot be detected. During running on a bad road, the engine receives torque from the road surface through driven wheels and it happens that even in the absence of a misfire, the value of the combustion parameter D1A increases. Accordingly, the conditions that no misfire occurs and running is not on a bad road are met, calculation of the pitch error correction coefficient is executed. Other conditions that the engine speed and the load are within predetermined ranges, the value of cooling water temperature is within a predetermined range, the change rate of throttle opening is within a predetermined range and the atmospheric pressure is within a predetermined range can also be conditions for calculation of the pitch error correction coefficient.

Figure 6:
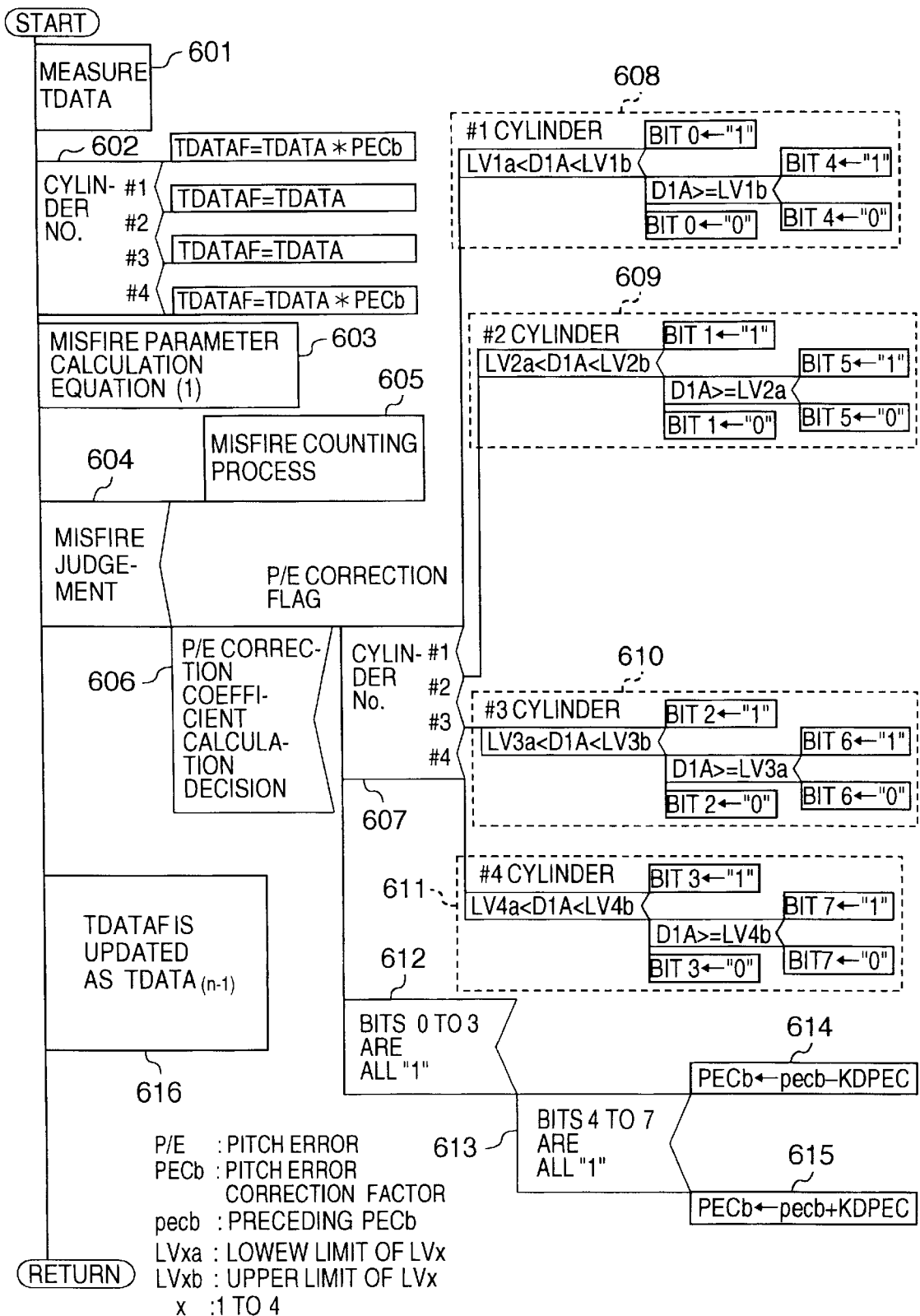
FIG. 6 is a flow chart showing control of a misfire diagnosis PAD chart using the pitch error correction based on the combustion state detecting apparatus.

FIG. 6 is a PAD (Problem Analysis Diagram) chart representing a program of misfire diagnosis using the pitch error correction, showing a flow of diagnostic control in which the processing is carried out each time ignition occurs.

Firstly, in step 601, the window pass time TDATA is measured and the program proceeds to step 602. In step 602, window pass times TDATA measured in the first and fourth cylinders are multiplied by a pitch error coefficient PECb. The corrected window pass times TDATA are indicated by TDATAF.

Subsequently, the program proceeds to step 603 in which a combustion state parameter D1A is calculated pursuant to the previously-described equation (1) and then proceeds to step 604. In the step 604, the combustion state parameter is compared with a particular threshold value D1ATH to decide whether or not a misfire is present. If the value of D1A is larger than the decision level D1ATH, a misfire is determined, so that the program proceeds to step 605 in which number of times of misfires is counted.

When the combustion state parameter D1A is smaller than the decision level D1ATH, the program proceeds to step 606 in which it is decided whether the pitch error correction coefficient calculating condition is satisfied. If the condition is satisfied, the program proceeds to step 607 and then to steps 608 to 611 in which the condition is checked for LV1 to LV4 which are spread to bands within the range between upper and lower limits of the combustion state parameters of the respective cylinders.

In the RAM provided in the control unit 207, a register of 8 bits is set as an area of a pitch error correction flag. Of bits of the flag register, the 0-th and fourth bits (bits 0 and 4) are for the first cylinder, the first and fifth bits (bits 1 and 5) are for the second cylinder, the second and sixth bits (bits 2 and 6) are for the third cylinder and the third and seventh bits (bits 3 and 7) are for the fourth cylinder. The correction processing in a dotted-line encircled portion of step 608 will be described.

When the combustion parameter D1A of the first cylinder has a value which lies between upper limit LV1b (FIG. 5) and lower limit LV1a (FIG. 5), the 0-th bit of the flag is set to 1. When the combustion parameter D1A of the first cylinder exceeds the upper limit LV1b, the fourth bit of the flag is set to 1 and in the other case, the fourth bit is set to 0 and the 0-th bit is set to 0.

When the combustion parameter D1A of the second cylinder lies between upper limit LV2b and lower limit LV2a, the first bit of the flag is set to 1. When the combustion parameter D1A of the second cylinder is below the upper limit LV2b, the fifth bit of the flag is set to 1 and in the other case, the fifth bit is set to 0 with the first bit set to 0.

When the combustion parameter D1A of the third cylinder lies between upper limit LV3b and lower limit LV3a, the second bit of the flag is set to 1. When the combustion parameter D1A of the second cylinder is below the upper limit LV3b, the sixth bit of the flag is set to 1 and in the other case, the sixth bit is set to 0 with the second bit set to 0.

When the combustion parameter D1A of the fourth cylinder lies between upper limit LV4b and lower limit LV4a, the third bit of the flag is set to 1. When the combustion parameter D1A is above the upper limit LV4b, the seventh bit of the flag is set to 1 and in the other case, the seventh bit is set to 0 with the third bit set to 0.

If in step 612 lower bits 0 to 3 of the flag are all "1", the combustion state parameter D1A exists within the bands of LV1 to LV4 and hence updating of the pitch error correction coefficient is not executed.

If any one of the lower bits 0 to 3 is not "1", states of upper bits 4 to 7 are examined in step 613 and then if all of the upper bits are "1", the pitch error correction coefficient is decreased in step 614. If any one of the upper bits 4 to 7 is not "1", then the pitch error correcting coefficient is increased. Finally, in step 616, TDATAF updated by the present one for next calculation of the succeeding combustion state parameter D1A.

Figure 7A:
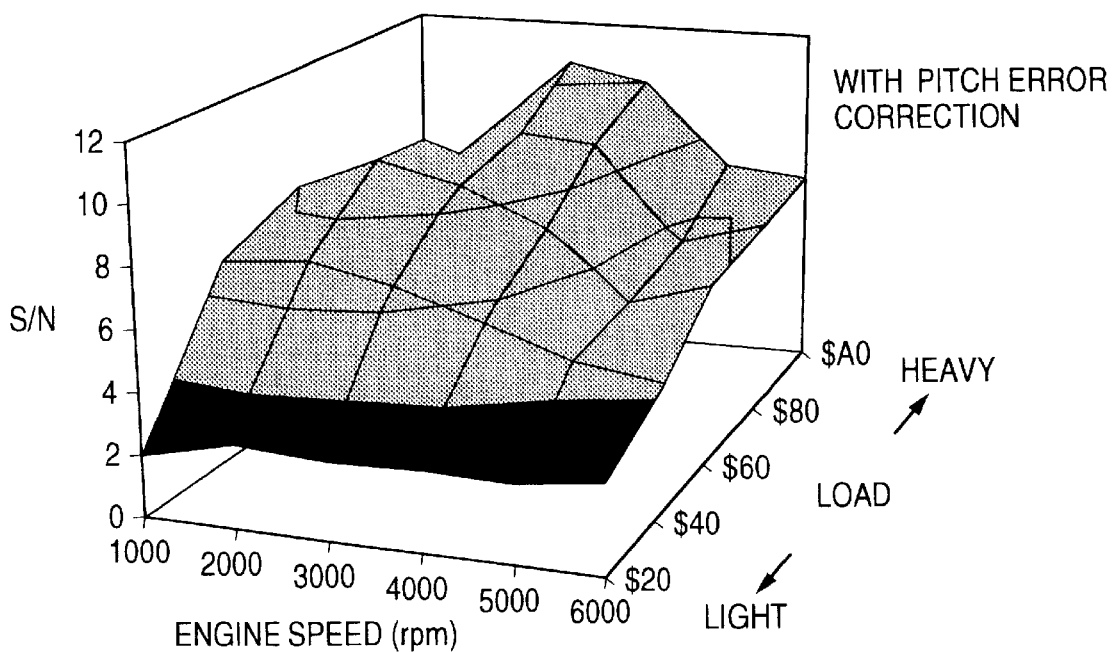
FIGS. 7A and 7B are graphical representations of the misfire detection S/N ratio in all running regions of the engine separately shown for the case of the presence of the pitch error correction and for the case of the absence of the pitch error correction.
Figure 7B:
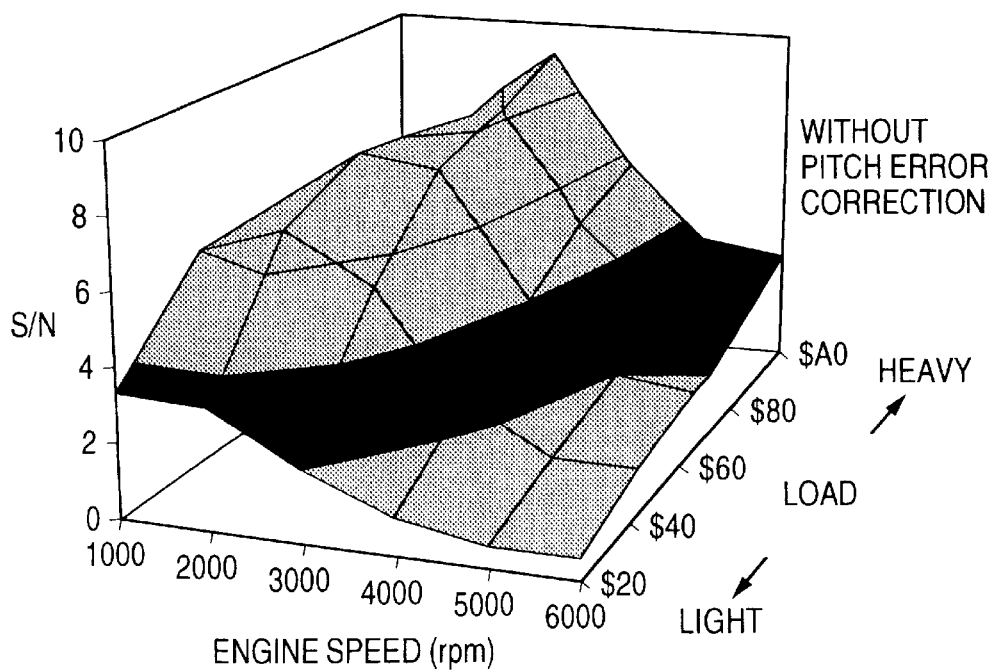

For the misfire diagnosis using the above pitch error correction, a method disclosed in JP-A-9-72241 by the same inventors as those of the present application, corresponding U.S. patent application Ser. No. 08/704,368 filed on Aug. 28, 1996 can be utilized. The misfire detection S/N ratios in all regions are measured by making the pitch error correction and changing the engine speed and the load to obtain results as shown in FIG. 7A. FIG. 7B shows results obtained in the absence of the pitch error correction. A comparison of FIG.

7A with FIG. 7B shows that the S/N ratio in the high engine speed region is degraded in the absence of the pitch error correction but the S/N ratio is improved over all running regions when the pitch error correction is applied.

Then the ratio between the S/N ratio with the pitch error correction and the S/N ratio without the pitch error correction (S/N improving ratio) is calculated to obtain results as shown in FIG. 8. In regions where the improving ratio is more than 1, the effect of pitch error correction is proven to be valid whereas in regions where the improving ratio is less than 1, the pitch error correction effect is invalid, resulting in a reverse effect. It will be seen from FIG. 8 that the effect of pitch error correction is valid in almost the whole regions but the improving ratio is less than 1 at low engine speeds and under low loads (especially, under no load). In low load regions hatched in FIG. 8 where the improving ratio is less than 1, the pitch error correction is not desired to be carried out. Accordingly, in an embodiment of the present invention to be described later, the correction coefficient PECb is set to 1 in such low load regions and the pitch error correction is not effected substantially.

In an embodiment of the invention, the region in which the S/N ratio is decreased is detected on the basis of the engine speed and the vehicle speed and in that region, the pitch error correction coefficient is set to a predetermined value (here, 1.0). This ensures that the S/N ratio of misfire detection can be prevented from being decreased during low load running inclusive of idling.

Next, a countermeasure against the decrease of S/N ratio which occurs when the pitch error correction coefficient calculating condition is not satisfied in the present embodiment will be described. As an example, a change in the combustion state parameter during running on a bad road is shown in FIG. 9.

Figure 9:
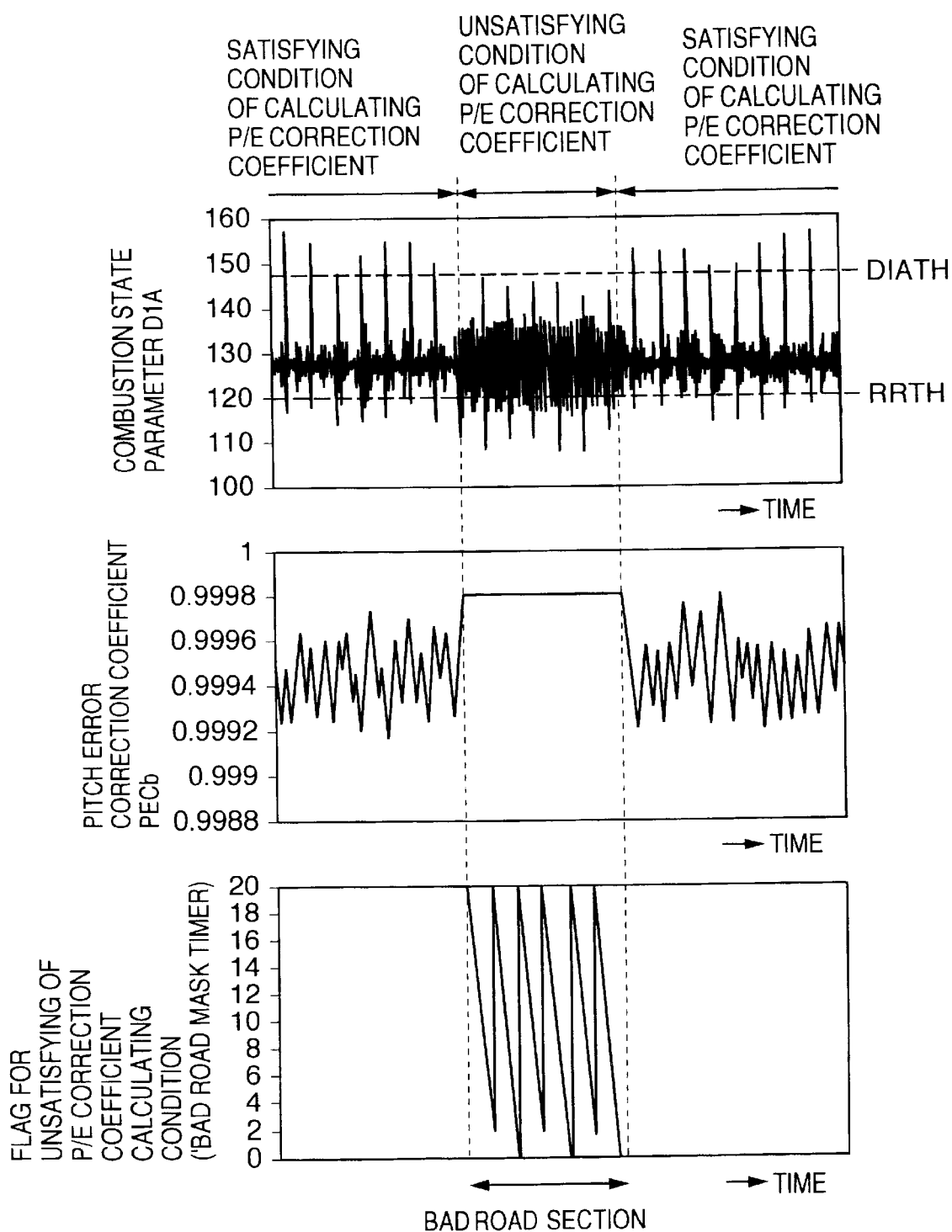
FIG. 9 is a diagram of time charts showing the combustion state parameter D1A and pitch error correction coefficient during running on a bad road.

As shown in FIG. 9, in a region where the pitch error correction coefficient PECb is calculated, the S/N ratio of misfire detection based on the combustion state parameter is high and the misfire diagnosis can be effected by setting the decision level D1ATH. But as the vehicle runs on a bad load, the engine speed varies by receiving torque from the load surface, so that the value of combustion parameter D1A approaches the decision reference value RRTH in a bad load section shown in FIG. 9. During running on a bad load as above, the pitch error correction coefficient calculating condition is not satisfied and the pitch error correction coefficient is set to a value which is finally calculated while the pitch error correction coefficient calculating condition is satisfied.

The varying width of the pitch error correction coefficient is large as shown in FIG. 9 and so the pitch error correction coefficient is not always set to a proper value when the pitch error correction coefficient calculating condition is not satisfied. Accordingly, with a combustion state parameter calculated on the basis of an improper pitch error correction coefficient, the S/N ratio of misfire detection is so degraded that the misfire diagnosis is difficult to perform even when the decision level is set.

In an embodiment of the present invention, an average value, for example, a weighted mean value of pitch error correction coefficients obtained over a time period starting with a past time point and ending in a current time point is determined when the pitch error correction coefficient calculating condition is not satisfied. In the event that the pitch error correction coefficient calculating condition is not satisfied during running on a bad road, the pitch error correction coefficient is set to the average value. Since the thus calculated average value corresponds to a value as a result of artificial measurement of the pitch error of the plate or ring gear, the setting of the average value when the pitch error correction coefficient calculating condition does not stand can lead to improvements in the detection accuracy under the invalidation of the condition.

Even without resort to the average value setting, any misfire will not be diagnosed erroneously because the diagnosis condition includes in the pitch error correction coefficient calculating condition. Since the average value PECFb is a value as a result of artificial measurement of the pitch error of the plate or ring gear, more accurate misfire detection can be ensured at the least.

Figure 10:
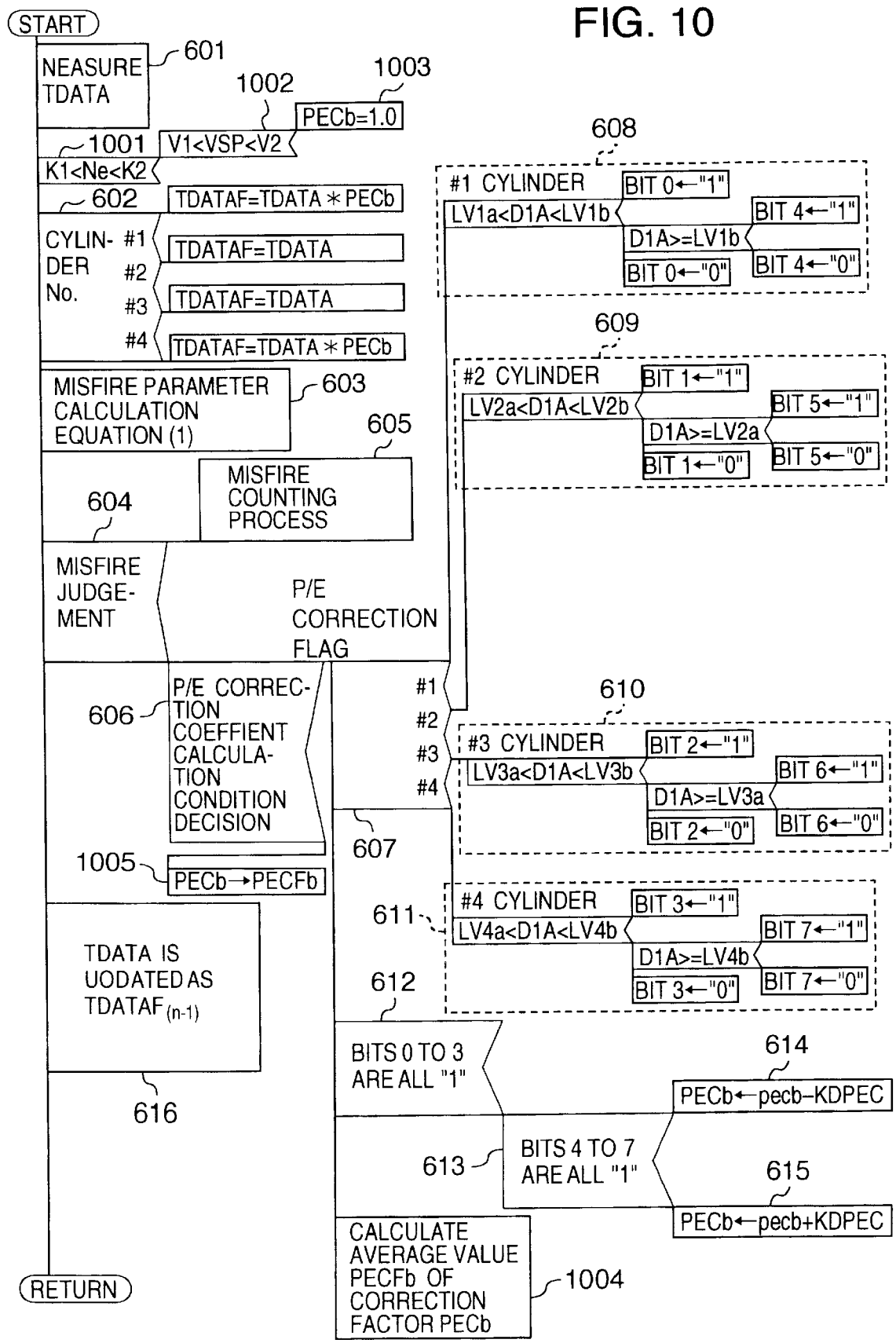
FIG. 10 is a flow chart showing control of a misfire diagnosis PAD chart using the pitch error correction based on the engine combustion state detecting apparatus of FIG. 1.

FIG. 10 is a PAD chart representing the misfire diagnosis processing according to the present embodiment applied with the processing as above, showing a control flow of the diagnosis.

Processes in steps 601 to 616 are identical to those described in connection with FIG. 6 and will not be described herein. After TDATA is measured in step 601, the engine speed Ne is decided in step 1001 and the vehicle speed VSP is decided in step 1002. When the engine speed Ne is within a predetermined range (K1<Ne<K2) and the vehicle speed VSP is within a predetermined range (V1<VSP<V2), the pitch error correction coefficient PECb is set to 1.0 in step 1003.

Further, after the pitch error correction coefficient PECb is calculated, an average value PECFb of pitch error correction coefficients is determined in step 1004. When the pitch error correction coefficient calculating condition is not satisfied in step 606, the pitch error correction coefficient is set to the average value PECFb in step 1005. An instance of running on a bad road is included in the case where the pitch error correction coefficient calculating condition is not satisfied. When the value of a calculated combustion parameter D1A is below the predetermined reference value RRTH (see FIG. 9), the running on a bad road is determined. In addition to the running on a bad road, conditions that no misfire occurs, the engine speed and load are within predetermined ranges, the cooling water temperature has a value which is within a predetermined range, the change rate of throttle opening is within a predetermined range and the atmospheric pressure is within a predetermined range can also be used as the pitch error correction coefficient calculating condition.

It is to be noted that the correction coefficient PECb is set to the average value PECFb only for a predetermined time interval starting with the time point that the bad road is detected.

Increased or decreased quantities of the pitch error correction coefficient (KDPEC in steps 614 and 615) may be set individually and may be stored as engine speed and load data maps in the memory. Alternatively, the increased or decreased quantity may be set to a constant.

As described above, when realizing the misfire diagnosis in the whole regions through the pitch error correction, the occurrence of a region in which the S/N ratio is decreased can be prevented. Further, by making correction with an average value of pitch error correction coefficients when the pitch error correction coefficient calculating condition is not satisfied, more accurate misfire detection can be ensured.

Embodiments of the present invention have been described but the invention is in no way limited to the foregoing embodiments and can be modified in design in various ways without departing from the spirit of the present invention recited in the appended claims.

For example, when the pitch error correction coefficient calculating condition is satisfied, pitch error correction coefficients and their average value may be calculated so that the average value may constantly be uses as correction value. In this case, there is a possibility that the response speed of the pitch error correction coefficient average value to a change of running region is delayed, but the processing procedure can be simplified slightly as shown in FIG. 10.

Figure 11:
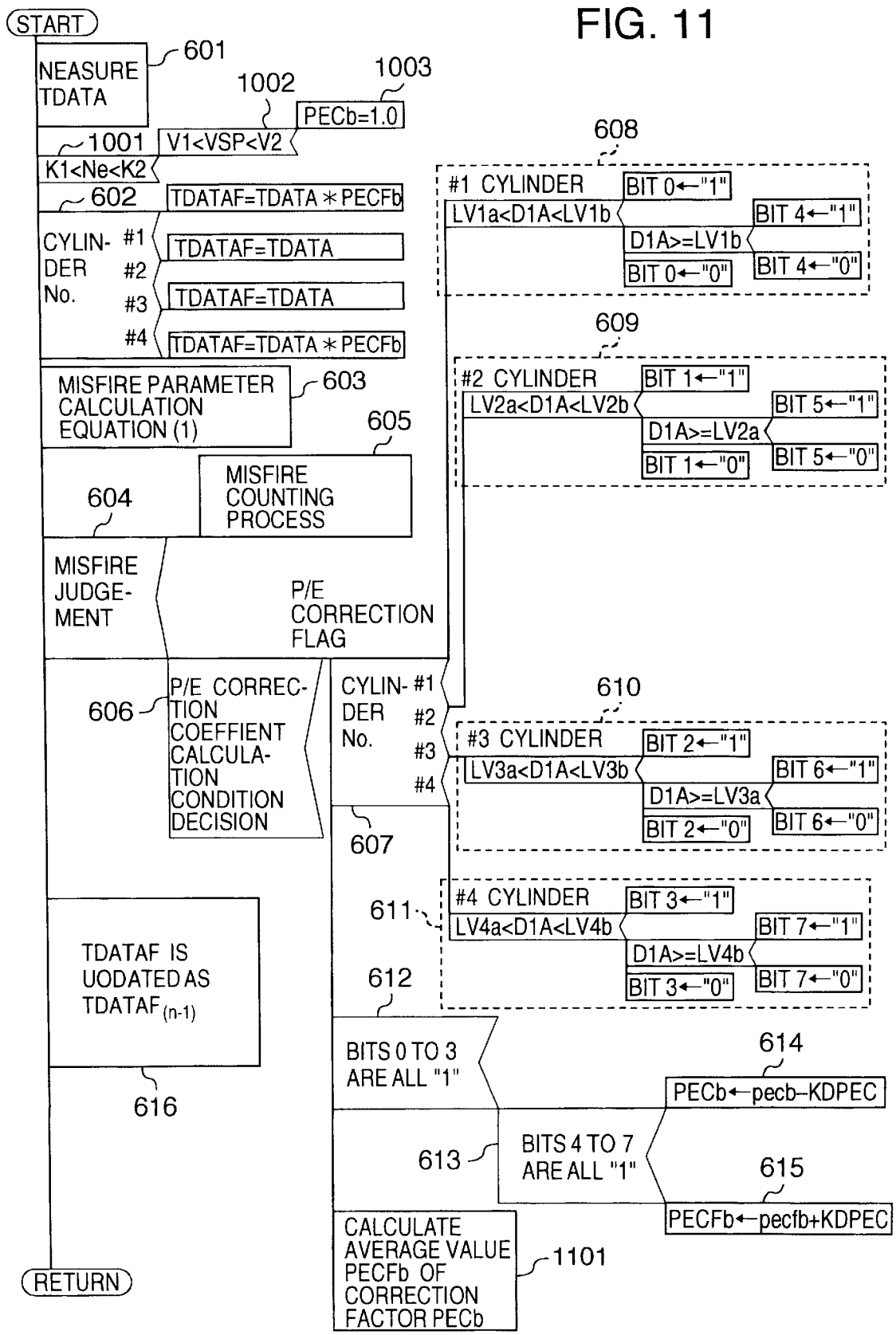
FIG. 11 is a flow chart showing another embodiment of control of a misfire diagnosis PAD chart using the pitch error correction based on the engine combustion state detecting apparatus.

FIG. 11 shows another embodiment of the misfire diagnosis PAD diagram for constantly making correction with a pitch error correction coefficient average value. Only differences from FIG. 10 will be described. In the flow of FIG. 11, the step 105 of FIG. 10 is removed and the step 1004 is changed to step 1101. In the step 1101, an average value of pitch error correction coefficients is calculated and the average value, as it is, is used as pitch error correction coefficient.

The computer program for executing the flow charts shown in FIGS. 6, 10 and 11 is recorded in the form of a computer readable code on a memory medium. Typically, such a program is recorded on the ROM of the control unit 207. Alternatively, the program may be recorded on a recording medium external of the control unit 207 such as for example a semiconductor memory, a magnetic disk, an optical disk or an IC card and as necessary, the control unit 207 may read the program from the external recording medium through a communication line.

As will be seen from the foregoing, the engine combustion state detecting apparatus of the present invention can prevent the occurrence of an S/N ratio decreasing region by performing the pitch error correction when realizing misfire diagnosis throughout the whole running regions of the engine. Further, when the pitch error correction coefficient calculating condition does not stand, correction is made with an average value of pitch error correction coefficients, thereby permitting more accurate misfire detection.

We claim:

1. An apparatus of detecting a combustion state of an internal combustion engine, comprising:

means for calculating a combustion parameter value of said engine on the basis of measurement data concerning an engine speed;

means for correcting a value of the data concerning the engine speed with a correction value;

means for calculating said correction value for making the calculated combustion parameter value fall within a predetermined range;

means for setting said correction value to a predetermined value when a predetermined condition is satisfied;

means for calculating an average value of correction values obtained in the past; and condition decision means, whereby when at least one of the running state of said engine and a running condition does not meet a predetermined condition, said correction value is set to said average value.

2. A detecting apparatus according to claim 1, wherein when said condition decision means determines that said calculated combustion parameter exceeds a predetermined reference value, said correction value is set to said average value.

3. A detecting apparatus according to claim 1 further comprising means for measuring a window pass time required for a rotary shaft of said engine to rotate through a predetermined rotation angle, wherein said means for calculating the combustion parameter value calculates the combustion parameter value pursuant to the following equation:

$$D1A = (TDATA_{(n)} - TDATA_{(n-1)})/(TDATA_{(n-1)})^3$$

where D1A represents combustion parameter, $TDATA_{(n)}$ represents window pass time at n-th sampling, $TDATA_{(n-1)}$ represents window pass time at (n−1)-th sampling, and n represents arbitrary positive integer.

4. A detecting apparatus according to claim 1, wherein when said predetermined condition is a predetermined engine state, said correction value is set to said predetermined value to make the data concerning the engine speed of said engine substantially equal to the data which is not corrected.

5. A detecting apparatus according to claim 1, wherein said predetermined condition corresponds to an engine speed which is less than a predetermined value and no load state.

6. A detecting apparatus according to claim 6 further comprising:

means for calculating an average value of correction values obtained in the past; and condition decision means, whereby when the running state of said engine and/or the circumstance condition during running does not meet a predetermined condition, said correction value is set to said average value.

7. A detecting apparatus according to claim 1 further comprising means for deciding a misfire by comparing a corrected combustion parameter value with a reference value, wherein said misfire decider means determines the occurrence of a misfire state when said combustion parameter value exceeds said reference value.

8. A detecting apparatus according to claim 7, wherein said correction value and said combustion parameter are determined in respect of each cylinder of said engine, and said misfire decider means decides a misfire in respect of each cylinder of said engine.

9. A detecting apparatus according to claim 7 further comprising a memory for storing a data map indicating said misfire decision reference value in relation to parameters which are the engine speeds and the loads.

10. A detecting apparatus according to claim 8, wherein when the value of combustion parameter obtained at the time that no misfire occurs in a predetermined reference cylinder and a cylinder which is in phase with said reference cylinder is below a predetermined value and the value of combustion parameter obtained at the time that no misfire occurs in other cylinders is above the predetermined value, said means for calculating correction value decreases the correction value for the other cylinders but increases the correction value therefor in the other case.

11. A detecting apparatus according to claim 8, wherein when the value of combustion parameter obtained at the time that no misfire occurs in a predetermined reference cylinder and a cylinder which is in phase with said reference cylinder is below a predetermined value and the value of combustion parameter obtained at the time that no misfire occurs in other cylinders is above the predetermined value, said means for calculating correction value increases the correction value for said cylinder in phase with said reference cylinder but decreases the correction value for said in-phase cylinder in the other case.

12. A detecting apparatus according to claim 8, wherein when the value of combustion parameter obtained at the time that no misfire occurs for all of the cylinders is within a predetermined range, said means for calculating correction value does not change the correction value for a predetermined reference cylinder and a cylinder which is in phase with said reference cylinder, and wherein when the value of combustion parameter obtained at the time that no misfire occurs in said reference cylinder and said cylinder which is in phase with said reference cylinder is below a predetermined value and the value of combustion parameter obtained at the time that no misfire occurs in other cylinders is above the predetermined value, said means for calculating correction value decreases the correction value for the other cylinders but increases the correction value therefor in the other case.

13. A detecting apparatus according to claim 8, wherein when the value of combustion parameter obtained at the time that no misfire occurs in all of the cylinders is within a predetermined range, said means for calculating correction value does not change the correction value for a predetermined reference cylinder and a cylinder which is in phase with said reference cylinder, and wherein when the value of combustion parameter obtained at the time that no misfire occurs in said reference cylinder and said cylinder in phase with said reference cylinder is below a predetermined value and the value of combustion parameter obtained at the time that no misfire occurs in other cylinders is above the predetermined value, said means for calculating correction value increases the correction value for said cylinder in phase with said reference cylinder but decreases the correction value for said in-phase cylinder in the other case.

14. A detecting apparatus according to claim 1 further comprising condition decider means, wherein said condition decider means decides whether or not one or more decision parameters including the engine speed, the load, the cooling water temperature, the change rate of throttle opening in a time, the measurement value of atmospheric pressure and the presence or absence of misfire satisfy a predetermined condition, and when said condition is satisfied, said correcting means corrects data concerning the engine speed by using a correction value calculated by said means for calculating said correction value.

15. A detecting apparatus according to claim 14 further comprising means for calculating an average value of correction values obtained in the past and updating said calculated average value each time said average value is calculated, wherein when the running state of said engine and/or the circumstance condition during running does not satisfy a predetermined condition, said correction value is set to an updated average value.

16. A detecting apparatus according to claim 14, wherein when said predetermined condition is satisfied and the engine speed and the speed of a vehicle carrying said engine meet a predetermined condition, said correction value is set to said predetermined value to make the data concerning the engine speed substantially equal to the data which is not corrected.

17. A detecting apparatus according to claim 14, wherein said correction value has an upper limit and a lower limit.

18. A method of detecting a combustion state of an internal combustion engine, comprising the steps of:
    measuring measurement data concerning an engine speed of said engine;
    calculating a combustion parameter value of said engine on the basis of the measurement data concerning said engine speed;
    correcting the value of the data concerning the engine speed with a correction value;
    calculating said correction value for making the calculated combustion parameter value fall within a predetermined range;
    setting said correction value to a predetermined value when a predetermined condition is satisfied;
    calculating an average value of correction values obtained in the past; and
    setting said correction value to said average value when at least one of the running state of the engine and a running condition does not meet a predetermined condition.

19. A computer program product comprising a computer usable medium having computer readable program code means embodied in said medium for detecting a combustion state of an internal combustion engine, said computer readable program code means comprising:
    means for fetching measurement data concerning an engine speed;
    means for calculating a combustion parameter value of said engine on the basis of the measurement data concerning the engine speed;
    means for correcting the value of the data concerning the engine speed with a correction value;
    means for calculating said correction value for making the calculated combustion parameter value fall within a predetermined range;
    means for setting said correction value to a predetermined value when a predetermined condition is satisfied;
    means for calculating an average value of correction values obtained in the past; and
    condition decision means,
    whereby when at least one of the running state of said engine and a running condition does not meet a predetermined condition, said correction value is set to said average value.

* * * * *